United States Patent [19]

Shoup

[11] 4,340,239
[45] Jul. 20, 1982

[54] FARM IMPLEMENT WITH TWO-WAY HITCH

[76] Inventor: Kenneth E. Shoup, P.O. Box 121, Bonfield, Ill. 60913

[21] Appl. No.: 146,428

[22] Filed: May 5, 1980

[51] Int. Cl.³ .......................... B60D 1/14; B62D 53/04
[52] U.S. Cl. ................................. 280/415 R; 172/625
[58] Field of Search .................. 280/415 R, 412, 462, 280/478, 491 R, 491 B, 491 D; 172/625, 248; 56/228

[56] References Cited

U.S. PATENT DOCUMENTS

| | | | |
|---|---|---|---|
| 3,635,495 | 1/1972 | Orendorff | 280/415 R |
| 4,119,329 | 10/1978 | Smith | 280/415 R |
| 4,162,085 | 7/1979 | Miranowski | 280/412 |
| 4,204,699 | 5/1980 | Gustafson | 280/415 R |
| 4,223,741 | 9/1980 | Blumhardt | 280/415 R |

Primary Examiner—Joseph F. Peters, Jr.
Assistant Examiner—Donn McGiehan
Attorney, Agent, or Firm—Dithmar, Stotland, Stratman & Levy

[57] ABSTRACT

A farm implement for attachment to a draft vehicle including an elongated frame, a set of wheels mounted on the frame at one end for rotation about axes normal to the longitudinal axis of the frame, hydraulic motors for moving the wheels between an upper field position and a lower transport position, a tongue pivotally connected to the frame adjacent to the other end thereof and having draft and connecting sections disposed at a 50° angle to each other, the tongue in the field position having the draft connection disposed normal to the longitudinal axis of the frame at the midpoint thereof and in the transport position being disposed parallel to the longitudinal axis of the frame midway between the wheels, a link interconnecting the tongue and the frame to hold the tongue in the field position and latch mechanism engaging the tongue to hold it in the transport position.

9 Claims, 12 Drawing Figures

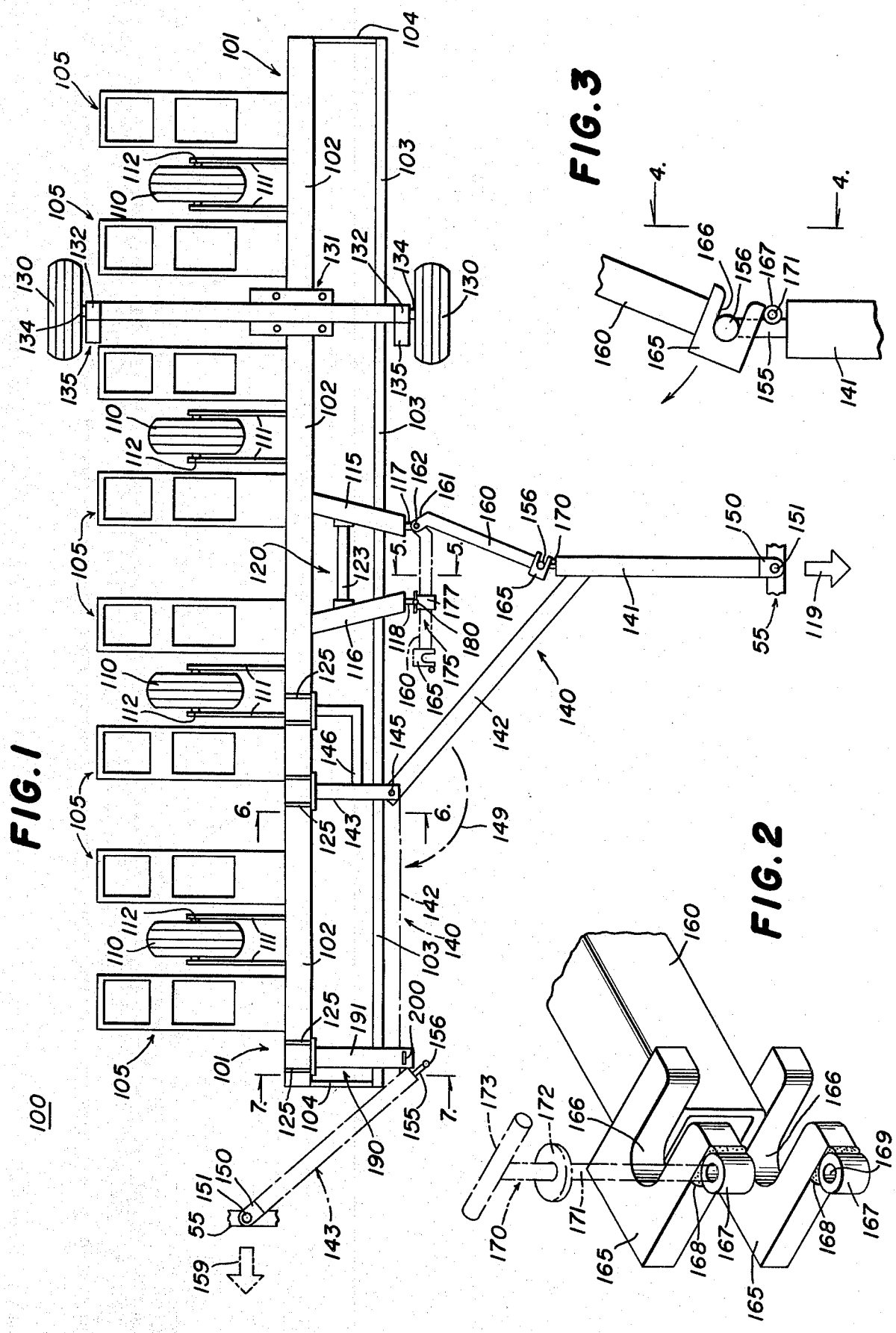

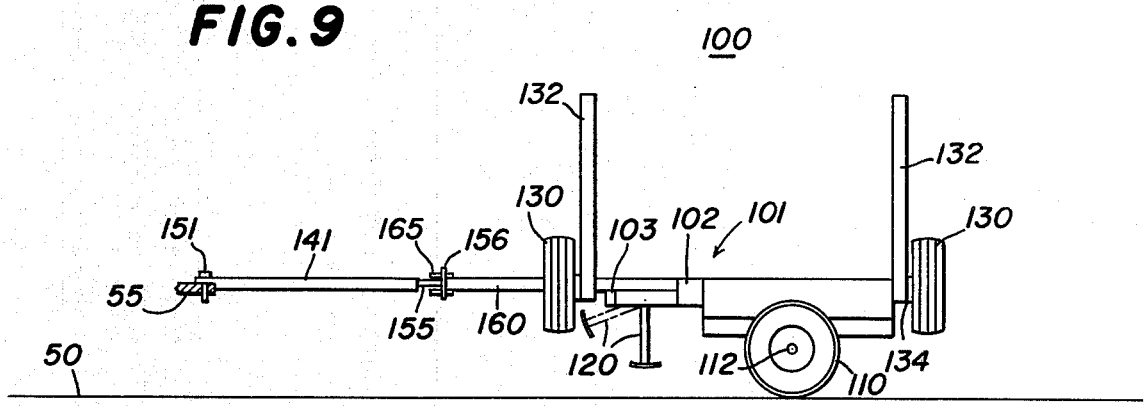
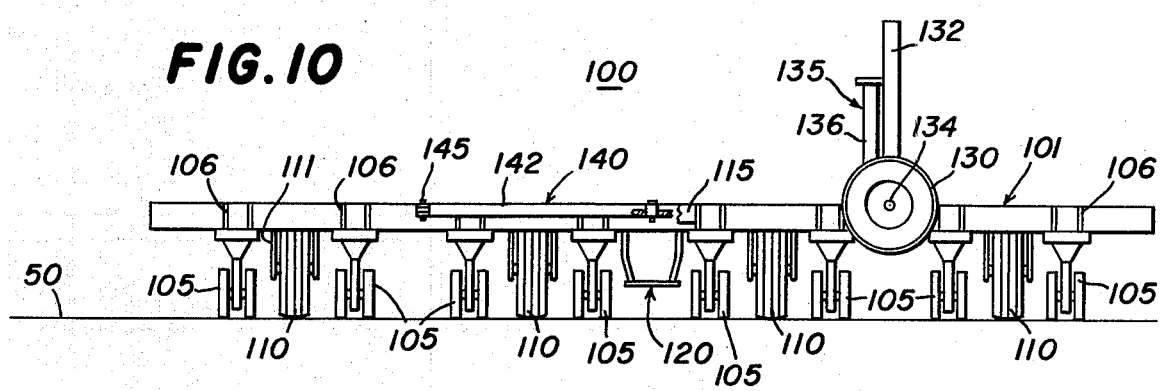
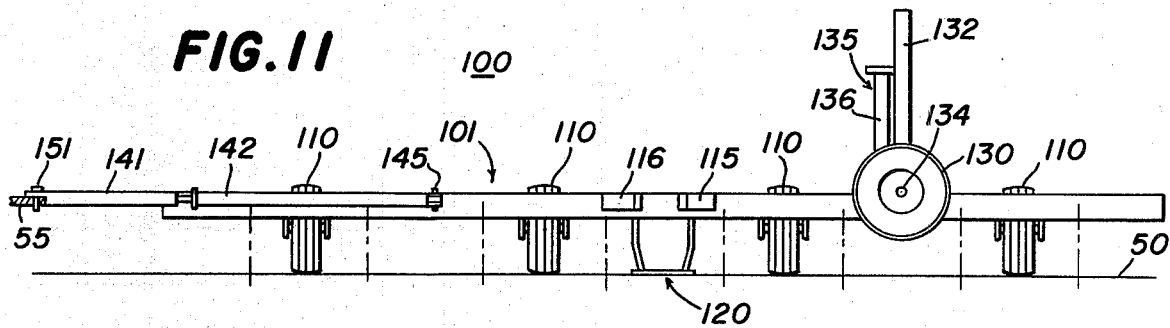
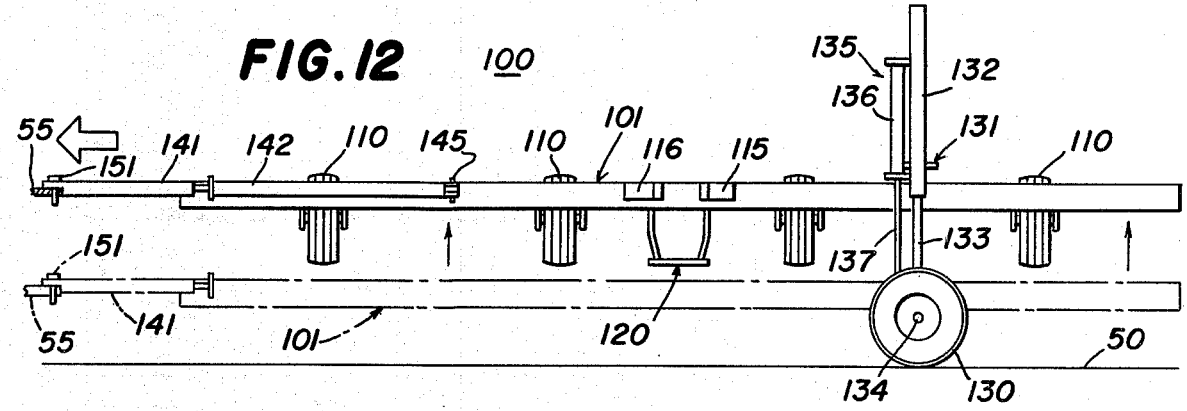

FARM IMPLEMENT WITH TWO-WAY HITCH

PRIOR ART STATEMENT AND BACKGROUND OF THE INVENTION

The present invention relates to farm implements having a substantial width provided with a two-way hitch including a tongue that can be pivoted between a field position and a transport position.

In order to achieve economies in cultivation, modern farm implements are provided with substantial width, and for example, in the case of a corn planter, it is common to provide the planter with eight planting units resulting in a total implement width of about 25 feet, and in yet other configurations of corn planters, there are provided 12 planting units resulting in a farm implement width of about 30 feet. Many farmers must move the farm implement from field to field, and often along public highways. During such road transport of the farm implement, it is desirable to have a much narrower width, whereby it has been customary heretofore to either fold the farm implement into a more compact configuration, or to convey the farm implement in a direction normal to its width. One example of such prior structure is shown in U.S. Pat. No. 3,635,495 granted Jan. 18, 1972 to J. W. Orendorff. In that patent, an auxiliary set of wheels is provided that supports the farm implement while in the road transport position, and an auxiliary hitch is provided, which auxiliary hitch requires the tractor or other draft vehicle to be disconnected from the main hitch and reconnected to the auxiliary hitch.

There is illustrated in U.S. Pat. No. 4,119,329 granted Oct. 10, 1978 to L. E. Smith a farm implement wherein the hitch is convertible between a field position and a transport position without disconnecting the hitch from the tractor or other draft vehicle. The hitch is pivotally mounted to the implement frame midway the longitudinal extent thereof and has reinforcing braces removably latched to the hitch to hold the hitch in the field position. When it is desired to transport the farm implement from field to field or upon a highway, the reinforcing braces are released and slide along the hitch while the hitch is pivoted 90° to a transport position thereof. In the field position, the hitch is too long and provides for a long coupling between the draft vehicle and the farm implement, which results in a long turning radius and less control of the farm implement in the field. In the transport position, the hitch is disposed to one side of the farm implement, whereby the farm implement is not drawn from the center thereof but rather to the side, this arrangement resulting in guiding difficulties when the farm implement is in the transport position.

BRIEF SUMMARY OF THE INVENTION

The present invention provides a farm implement having a hitch which can be readily moved between a field position and a transport position, the hitch in the field position providing for short coupling between the farm implement and the draft vehicle and in the transport position providing for connection to the farm implement along essentially the longitudinal center line thereof, thus providing for better control in both the field position and the transport position.

This is accomplished in the present invention, and it is an object of the invention to accomplish these desired results, by providing a farm implement for attachment to a draft vehicle including an elongated frame for mounting farm tools to be drawn through a field in a field direction normal to the longitudinal axis of the frame and to be drawn along a highway in a transport position parallel to the longitudinal axis of the frame, a set of wheels shiftably mounted upon the frame adjacent to one end thereof for rotation about axes disposed normal to the longitudinal axis of the frame, means for shifting the wheels between an upper field position out of contact with the underlying surface and a lower transport position in contact with the underlying surface, a tongue including a draft section having a draft connection at one end thereof and a connecting section at the other end thereof disposed at an obtuse angle with respect to the draft section, the tongue having a field position wherein the draft section is disposed normal to the longitudinal axis of the frame at the midpoint thereof and having a transport position wherein the draft section is disposed parallel to the longitudinal axis of the frame about midway between the wheels, the free end of the connecting section of the tongue being pivotally connected to the frame at a point disposed a substantial distance from the longitudinal midpoint of the frame toward the other end of the frame to accommodate pivotal movement of the tongue between the field and transport positions thereof, a link having one end for connection to the frame at a point disposed between the longitudinal midpoint of the frame and the one end of the frame and having the other end for connection to the tongue adjacent to the juncture of the draft and connecting sections when the tongue is in the field position thereof, and a latch mechanism providing the connection for one of the ends of the link to the cooperating structure and a pivot providing the connection for the other of the ends of the link to the cooperating structure.

Another object of the invention is to provide a farm implement of the type set forth wherein the link is pivotally connected to the frame and the latch mechanism is disposed between the free end of the link and the tongue.

Yet another object of the invention is to provide a farm implement of the type set forth and further including means for securing the tongue intermediate the length thereof to the frame when the tongue is in the transport position thereof.

A further object of the invention is to provide a farm implement of the type set forth including means for securing the link to the frame when the tongue is in the transport position thereof.

Further features of the invention pertain to the particular arrangement of the parts of the farm implement and hitch therefor, whereby the above outlined and additional operating features thereof are attained.

The invention, both as to its organization and method of operation, together with further features and advantages thereof will best be understood with reference to the following specification taken in connection with the accompanying drawings.

BRIEF DESCRIPTION OF THE DRAWINGS

FIG. 1 is a plan view of a farm implement made in accordance with and embodying the principles of the present invention, the tongue thereof being shown in the field position in solid lines and in the transport position in dashed lines;

FIG. 2 is an enlarged fragmentary perspective view of the latch mechanism for interconnecting the link and the tongue;

FIG. 3 is an enlarged plan view with certain parts broken away showing the interconnection of the latch mechanism with the link and the tongue;

FIG. 9 is an end elevational view as seen in the direction of the arrows along the line 9—9 of FIG. 8; and FIGS. 10-12 are sequential views showing the procedure for changing the farm implement of FIG. 1 from the field position illustrated in FIGS. 1, 9 and 10 to the transport position illustrated by solid lines in FIG. 12.

DETAILED DESCRIPTION OF THE PREFERRED EMBODIMENT

Figure 8:
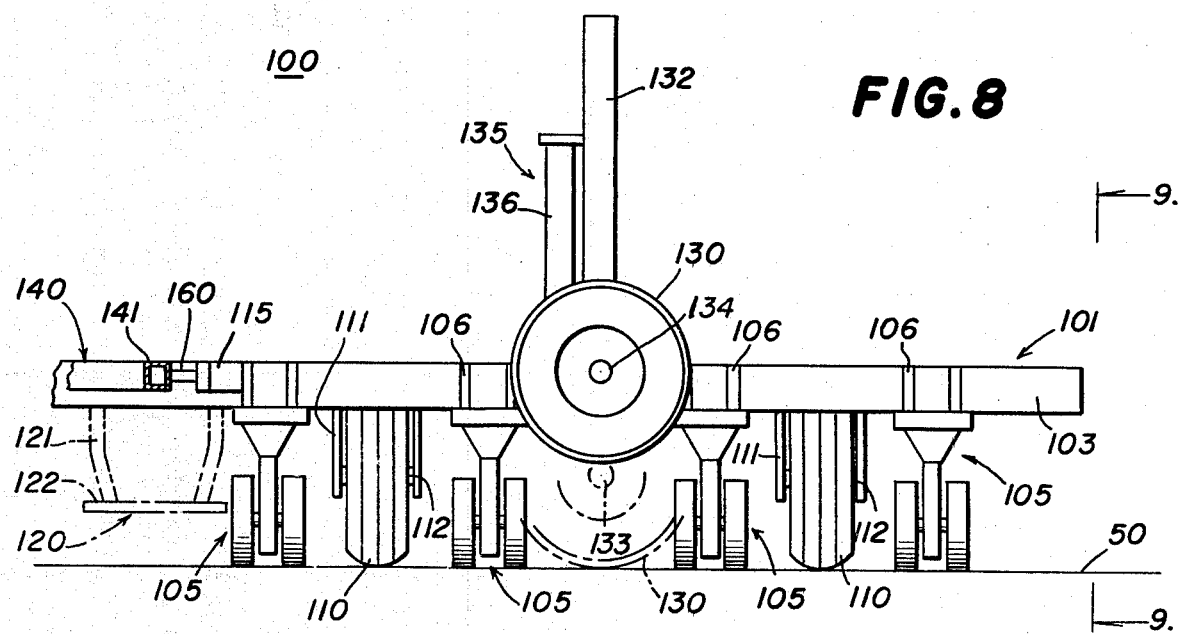
FIG. 8 is a front elevational view of the righthand half of the farm implement of FIG. 1, the transport wheels being shown in solid lines in the field position and in dashed lines in the transport position.

There is illustrated in FIG. 1 of the drawings a farm implement 100 made in accordance with and embodying the principles of the present invention, the farm implement 100 as illustrated being an eight row corn planter. The farm implement 100 includes an elongated frame 101 having a main frame member 102 extending the length thereof and a forward frame member 103 joined to the main frame member 102 by struts 104. Mounted on the frame 101 are eight corn planter units 105 secured thereto by mounting structure 106 (see FIG. 8 also).

In order to provide support for the farm implement 100 while in the field, four wheels 110 have been provided spaced along the frame 101, each of the wheels 110 being supported by two struts 111 secured to the frame 101 and supporting an axle 112 upon which the wheel 110 rotates. Mechanism (not shown) is provided for changing the inclination of the struts 111 to the frame 101 thereby to raise and lower the frame 101 and the planter units 105 thereon, all as is well known in the art.

Disposed on either side of the longitudinal midpoint of the frame 101 are forwardly extending draft struts 115 and 116 which converge forwardly toward each other, and in normal use carry a standard draft tongue 141 thereon which is adapted to be connected to a draft vehicle for drawing the farm implement 100 through the field in the direction of the arrow 119 in FIG. 1. The standard tongue supported by the draft struts 115 and 116 cannot be converted for use to permit the draft vehicle to draw the farm implement in a transport position.

Disposed between the draft struts 115 and 116 is a transport stand 120 that is pivotal between a field position (illustrated by dashed lines in FIG. 9) and a support position (illustrated by solid lines in FIG. 9). The transport stand 120 more particularly includes two arms 121 carrying on the lower ends thereof a support base 122 and at the upper ends thereof being supported by a shaft 123 disposed between the draft struts 115 and 116. Before disconnecting the draft vehicle attached to the standard tongue on the draft struts 115 and 116, the transport stand 120 is moved to the support position thereof so as to support the farm implement 100 after it is disconnected from the draft vehicle.

In accordance with the present invention, the standard tongue ordinarily supported by the draft struts 115 and 116 is removed and several attachments are made to the farm implement 100 so that a draft vehicle hitched thereto can be moved between a field position and a transport position.

One attachment made to the farm implement 100 are two transport wheels 130 that are mounted on a sub-frame 131 suitably secured to the implement frame 101. Disposed at each end of the sub-frame 131 is a guide 132 housing a shaft 133, the shaft 133 supporting therebetween an axle 134 on the ends of which are mounted the wheels 130. In order to move the wheels 130 between the field position and the transport positions thereof, there has been provided two hydraulic motors 135 each having a cylinder 136 with a piston rod 137 and a cooperating piston (not shown). The piston rods 137 (see FIG. 12) are secured to the axle 134 and serve to raise and lower the axle 134 and the wheels 130 carried thereby upon actuation of the hydraulic motors 135 when desired.

Figure 6:
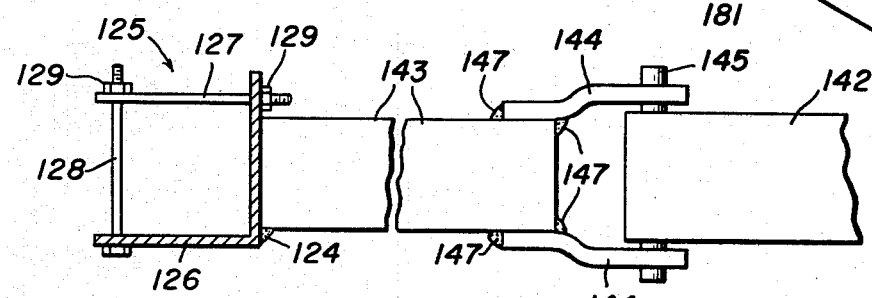
FIG. 6 is an enlarged fragmentary view in vertical section along the line 6—6 of FIG. 1 with the implement frame removed.

In place of the standard tongue originally supported on the draft struts 115 and 116, there has been provided a tongue 140 having a draft section 141 that is essentially a hollow box structure in cross section and a connecting section 142 that is also a hollow box construction in cross section. The tongue 140 is mounted on the implement frame 101 by means of a mounting bracket 143 to which the tongue 140 is pivotally secured by a pivot pin 145. Referring more particularly to FIG. 6 of the drawings, it will be seen that the mounting bracket 143 is secured to the frame 101 (not shown) by an attachment structure 125. The attachment structure 125 includes an angle iron 126 to one leg of which the mounting bracket 143 is secured as by welding at 124. Extending through openings in the flanges of the angle iron 126 is an eye bolt 127 and a bolt 128, the two bolts 127 and 128 being secured in place about the associated frame by nuts 129. The other end of the mounting bracket 143 carries a pair of pivot arms 144 secured thereto as by welds 147, the pivot arms 144 carrying the pivot pin 145 that passes through an opening in the connecting section 142 of the tongue 140.

Figure 4:
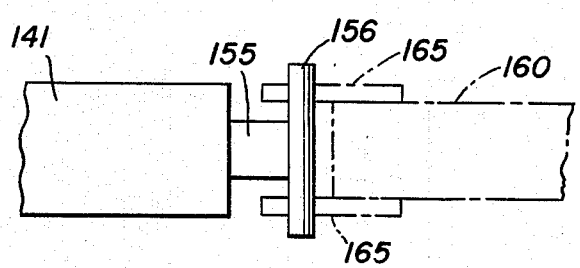
FIG. 4 is a further enlarged view in side elevation as seen in the direction of the arrows along the line 4—4 of FIG. 3.

The other end of the connecting section 142 is fixedly secured to the draft section 141 adjacent to one end thereof, the longitudinal axes of the draft section 141 and the connecting section 142 making an obtuse angle of about 130°. The other end of the draft section 141 carries a hitch connection 150 through which passes a pin 151 for securing the hitch connection 150 to a three-point hitch generally designated by the numeral 55, it being understood that the three-point hitch 55 is mounted upon a tractor or other suitable draft vehicle. Referring to FIGS. 3 and 4 of the drawings, the end of the draft section 141 adjacent to the juncture of the connecting section 142 extends rearwardly beyond the juncture and carries a rod 155 extending rearwardly and carrying a cross bar 156 thereon.

In order to maintain the tongue 140 in the field position illustrated by solid lines in FIG. 6, a link 160 has been provided interconnecting the draft section 141 and the implement frame 101 through the draft strut 115. More specifically, the draft strut 115 carries a forwardly directed extension 117 which is received between two flanges 161 on the rear end of the link 160, a pivot pin 162 passing through aligned openings in the flanges 161 in the extension 117, thus pivotally to mount the link 160 upon the draft strut 115. The other end of the link 160 carries two mounting plates 165, the details of contruction of which are best seen in FIGS. 2, 3 and 4 of the drawings. There is formed in each of the connecting plates 165 an elongated slot 166 having the longitudinal axis thereof disposed normal to the longitudinal axis of the link 160. The forward surfaces of each of the conecting plates 165 carries a cylindrical bearing 167 secured thereto as by welds at 168 and each having an opening 169 therethrough. The openings 169 are designed to receive the shank 171 of a pin 170, the shank 171 also carrying a collar 172 fixed thereon to limit the distance that the pin 170 can pass through the openings 169 and also carrying at the upper end thereof a handle 173 to be grasped by a user. The draft section 141 of the tongue 140 is secured to the link 160 by placing the cross bar 156 in the slots 166 of the connecting plates 165. With the cross bar 156 in position within the slots 166, insertion of the pin 170 in the bearings 167, and specifically the insertion of the shank 171 in the openings 169, serves to retain the cross bar 156 in the connecting position since the shank 171 engages the side of the rod 155, thus to hold the cross bar 156 in the slots 166. The parts are readily disconnected by simply removing the pin 170 as will be explained more fully hereinafter.

Figure 5:
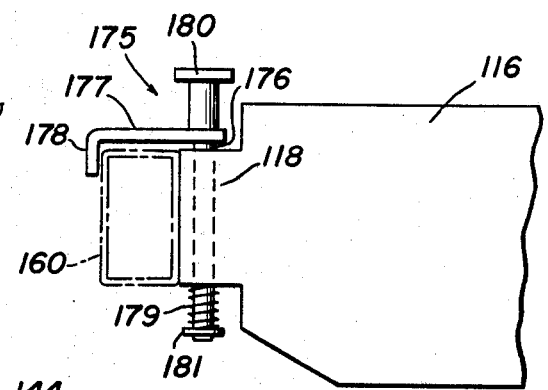
FIG. 5 is an enlarged view in vertical section along the line 5—5 of FIG. 1.

When the tongue 140 is in the transport position thereof, i.e., the dashed line position illustrated in FIG. 1, it is desirable to hold the link 160 in a storage position illustrated by dashed lines in FIG. 1. To this end the draft strut 116 has an extension 118 directed forwardly thereof and integral therewith and carrying an opening for accommodating a latch generally designated by the numeral 175 and including a shank 176 extending through the opening in the extension 118. The upper end of the shank 176 has an arm 177 extending forwardly therefrom and carrying on the outer end a hook 178, the hook 178 being spaced from the forward end of the extension 118 a distance slightly greater than the width of the associated link to be held thereby, the link 160 being shown in dashed lines in FIG. 5. The lower end of the shank 176 extends below the extension 118 and disposed thereabout is a spring 179 held in place by a washer 181 fixedly secured to the lower end of the shank 176. A handle 180 is disposed above the arm 177 and is shaped to be grasped by a user, the user by pulling upwardly on the handle 180 against the action of the spring 179 serving to lift the arm 177 and the hook 178. With the latch 175 lifted, the associated link 160 can be moved into and out of the retained storage position with respect to the hook 178.

Figure 7:
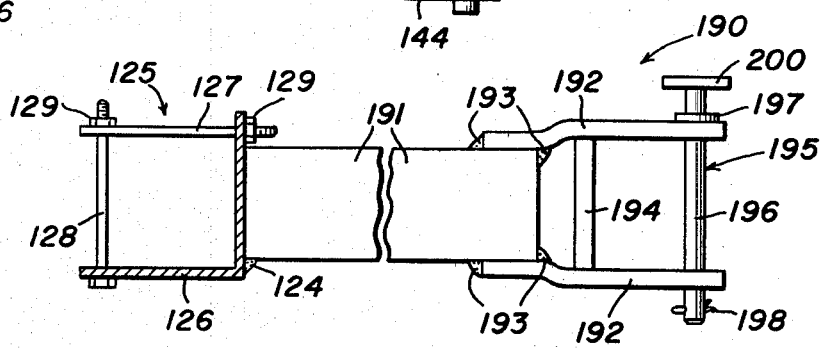
FIG. 7 is an enlarged fragmentary view in vertical section along the line 7—7 of FIG. 1 with the implement frame removed.

Also when the tongue 140 is in the transport position illustrated by dashed lines in FIG. 1, it is desired to secure the tongue 140 in this position, and to this end there has been provided a latch mechanism 190, the details of which are best shown in FIG. 7 of the drawings. A mounting bracket 191 is secured to the implement frame 101 by means of one of the attachment structures 125 described above. The mounting bracket 191 extends forwardly beyond the implement frame 101 and carries on the forward end thereof two arms 192 respectively secured to the upper and lower surfaces of the mounting bracket 191 such as by welds 193. An abutment plate 194 interconnects the arms 192 and forms an abutment against which the draft section 141 of the tongue 140 abuts when the tongue 140 is in the transport position illustrated by dashed lines in FIG. 1. The other ends of the arms 192 carry aligned openings receiving therethrough a latch pin generally designated by the numeral 195 and including specifically a shank 196 extending through the aligned openings in the arms 192. A collar 197 is secured to the shank 196 intermediate the ends thereof and in use rests upon the upper surface of the upper arm 192. The lower end of the shank 196 extends below the lower arm 192 and has an opening therein receiving therethrough a cotter pin 198. The upper ends of the shank 196 carries a handle 200 adapted to be grasped by a user in removing and inserting the latch pin 195 in the arms 192.

As has been stated above, certain portions of the farm implement 100 are of standard construction and are available commercially in the market, those parts including the implement frame 101, the corn planter units 105, the wheels 110 and the mounting structure therefor, the draft struts 115 and 116 and the transport stand 120. The draft struts 115 and 116 further have connected thereto as original equipment a double tongue, i.e., a two-piece tongue used to interconnect the farm implement to a draft vehicle such as a tractor. In accordance with the present invention, the original double tongue is removed from the draft struts 115 and 116. Thereafter, the transport wheels 130 are mounted upon the implement frame 101 by securing the sub-frame 131 thereto, the sub-frame 131 carrying the guides 132, the shaft 133 and the hydraulic motors 135.

The tongue 140 is secured to the implement frame 101, and more specifically, the mounting bracket 143 is secured to the main frame member 102 by means of the attachment structure 125; a reinforcing arm 146 on the mounting bracket 143 is likewise secured to the main frame member 102 by an attachment structure 125. The tongue 140 is then secured to the mounting bracket 143 by means of the pivot pin 145. The link 160 is secured to one of the draft struts 115 and the other draft strut 116 has mounted thereon the latch 175 described above. Finally, the latch mechanism 190 is secured to the main frame member 102 by the attachment structure 125.

In order to use the farm implement 100 in the field for planting corn, the tongue 140 is pivoted to the solid line position of FIG. 1 and the link 160 is likewise pivoted to the solid line position thereof so as to place the cross bar 156 in the slots 166 in the connecting plates 165. The pin 170 is then placed in its locking position by the user grasping the handle 173 and moving the pin downwardly as viewed in FIGS. 1, 2 and 3. The draft vehicle such as a tractor carrying a three-point hitch 55 is then backed so that the hitch connection 150 can receive the pin 151 therethrough to interconnect the tongue 140 and the three-point hitch 55. The various hydraulic lines for actuating the hydraulic motors for the wheels 110 and the hydraulic lines for the hydraulic motors 135 are then connected to the hydraulic system of the draft vehicle. The hydraulic motors 135 are actuated to raise the transport wheels 130 to the upper field position thereof and out of contact with the underlying surface 50. The support of the farm implement 100 is the wheels 110 which have preferably heretofore been lowered to the supporting positions thereof in contact with the underlying surface 50. By raising the wheels 110 to the desired position, the corn planter units 105 can be placed in operative positions and the farm implement 100 thereafter used in the field in the usual manner, the draft vehicle moving forwardly in the direction of the arrow 119.

An important feature of the present invention resides in the fact that the tongue 140 provides a short coupling between the farm implement 100 and the draft vehicle attached thereto. The short coupling provides good control by the operator using the draft vehicle over the farm implement 100 and provides an improved maneuverability. There further is less tendency for the farm implement 100 to drift when operating on a hillside. The close coupling between the draft vehicle and the farm implement 100 can be expressed by a ratio of the distance between the pin 151 and the forward end of the draft struts 115 and 116 when the parts are in the field position illustrated by solid lines in FIG. 1 and the distance between the ends of the farm implement 100. In the farm implement 100 illustrated, this ratio is 0.35, it having been found that this ratio should be in the range of about 0.3 to about 0.5 in order to give the desired close coupling between the draft vehicle and the farm implement 100. This short coupling provides for a minimum turning radius for the farm implement 100 as well as the good control described above.

When it is desired to move from the field position illustrated by solid lines in FIGS. 1 and 10 to the transport position illustrated by dashed lines in FIG. 1 and solid lines in FIG. 12, this is accomplished as follows. The transport stand 120 is lowered to the position illustrated by solid lines in FIG. 9. The hydraulic motors controlling the positions of the wheels 110 are then actuated to raise those wheels and thus to lower the farm implement 100 so that it is supported by the transport stand 120, the parts now being in the positions illustrated in FIG. 11. The four wheels 110 are then secured in this raised position such as by chains (not shown). The pin 151 is then removed to unhitch the draft vehicle from the tongue 140, and the various hydraulic lines extending between the farm implement 100 and the draft vehicle are disconnected. The pin 170 is then pulled which disconnects the tongue 140 from the link 160, after which the tongue 140 is pivoted from the solid line position in FIG. 1 to the dashed line position therein, i.e., the tongue 140 is pivoted in the direction of the arrow 149. The latch mechanism 190 is engaged, and more specifically, the user withdraws the cotter pin 198 and grasping the handle 200 removes the pin 195 from the mounting bracket arms 192. The draft section 141 of the tongue 140 is then moved between the arms 192 and against the abutment plate 194, after which the user reinserts the pin 195 through the openings in the arms 192 and replaces the cotter pin 198 in the lower portion of the shank 196. The user also pivots the link 160 from the solid line position of FIG. 1 to the dashed line position thereof, and by lifting the handle 190 causes the latch 175 to engage link 160 to hold it in this position.

The draft vehicle is then repositioned so that the three-point hitch 55 thereof can be reconnected to the tongue 140 by means of the pin 151, i.e., the parts being in the dashed line positions of FIG. 1. The hydraulic hoses are then reconnected and the transport wheels 130 are moved from the position illustrated by solid lines in FIGS. 8 and 9 to the dashed line position of FIG. 8 and the solid line position of FIG. 12. As is diagrammatically illustrated in FIG. 12, this moves the implement frame 101 upwardly from the lower dashed line position of FIG. 12 to the upper solid line position of FIG. 12, this being the transport position of the parts. The three-point hitch 55 is also actuated at this time so that the implement frame 101 is essentially level as indicated in FIG. 12. The draft vehicle can now draw the farm implement in the direction of the arrow 159 in FIG. 1 between fields or along a highway.

An important feature of the invention lies in the fact that with the parts in the transport position illustrated by dashed lines in FIG. 1 and by solid lines in FIG. 12, the hitch pin 151 is essentially midway between the transport wheels 130, i.e., lies on a line parallel to the main frame member 102 that essentially bisects the distance between the transport wheels 130. This configuration provides for good control of the farm implement 100 by the draft vehicle connected to the three-point hitch 55 during the road transport of the farm implement 100.

Upon arriving at the next field to be cultivated, the operation is essentially reversed. More specifically, the transport stand 120 is lowered if it is not already in the support position thereof, after which the three-point hitch 55 is lowered to the field position thereof, and the hydraulic motors 135 are actuated to move the parts to the positions illustrated in FIG. 11. The pin 151 is removed to disconnect the three-point hitch 55 from the tongue 140. The latch mechanism 190 is released by the user withdrawing the cotter pin 198 and lifting the latch pin 195 upwardly, thus freeing the tongue 140 to be pivoted in a counterclockwise direction as viewed in FIG. 1 from the dashed line position to the solid line position thereof. The user also releases the link 160 by releasing the latch 175 so that the thus freed link 160 can be pivoted from the dashed line position in FIG. 1 to the solid line position therein. The cross bar 156 is inserted in the slot 166 in the connecting plates 165 and the pin 170 reinserted in the bearings 167, thus to lock the tongue 140 in the field position thereof. The draft vehicle is then moved so that the three-point hitch 55 is in alignment with the opening in the hitch connection 150 after which the pin 151 is inserted to interconnect the three-point hitch 55 to the tongue 140. The hydraulic lines are then reconnected, after which the chains or other devices holding the support wheels in the up position are removed. The hydraulic motors controlling the wheels 110 are then actuated to raise the implement frame 101 after which the transport stand 120 can be moved to the storage position, i.e., from the solid line position in FIG. 9 to the dashed line position therein. Thereafter, the wheels 110 are adjusted so as to place the corn planter unit 105 in the proper position for field use, after which the draft vehicle can draw the farm implement 100 in the direction of the arrow 119 in FIG. 1.

Although corn planter units 105 have been shown mounted on the farm implement 100 for illustrative purposes, it will be understood that a large number of tools may be advantageously substituted for the corn planter units 105. Other examples of tools that may be advantageously used are rotary hoes and "duck foot" field cultivators.

While there has been described what at present is considered to be the preferred embodiment of the invention, it will be understood that various modifications may be made therein, and it is intended to cover in the appended claims all such modifications as fall within the true spirit and scope of the invention.

What is claimed is:

1. A farm implement for attachment to a draft vehicle comprising an elongated frame for mounting farm tools to be drawn through a field in a field direction normal to the longitudinal axis of said frame and to be drawn along a highway in a transport direction parallel to the longitudinal axis of said frame, a single set of wheels shiftably mounted upon said frame adjacent to one end thereof for rotation about a common axis disposed normal to the longitudinal axis of said frame, means for shifting said wheels between an upper field position out of contact with the underlying surface and a lower transport position in contact with the underlying surface, a tongue including a draft section having a draft connection at one end thereof for connection to a three point hitch of a draft vehicle and a connecting section at the other end thereof disposed at an obtuse angle with respect to said draft section, said tongue having a field position wherein the draft section is disposed normal to the longitudinal axis of said frame at the midpoint thereof and having a transport position wherein said draft connection lies on a line parallel to the longitudinal axis of said frame about midway between said wheels, the free end of said connecting section of said tongue being pivotally connected to said frame at a point disposed a substantial distance from the longitudinal midpoint of said frame toward the other end of said frame to accommodate pivotal movement of said tongue between the field and transport positions thereof, said connecting section of said tongue being adapted to be in communication with said frame at a point disposed between the longitudinal midpoint of said frame and said one end of said frame when said tongue is in the field position thereof, and latch mechanism providing the connection for the cooperating structure and a pivot providing the communication between said tongue and said frame, whereby when said tongue is held in the field position thereof by engagement of said latch mechanism and said single set of wheels is held in the upper position thereof by said shifting means said implement can be drawn by the associated draft vehicle in the field direction and when said tongue is released to the transport position thereof by disengagement of said latch mechanism and said single set of wheels is held in the lower position by said shifting means said implement is solely supported by said single set of wheels and the three point hitch of the associated draft vehicle and can be drawn by the associated draft vehicle in the transport direction.

2. The farm implement set forth in claim 1, wherein said set of wheels move vertically between the upper field position and the lower transport position thereof.

3. The farm implement set forth in claim 1, wherein said shifting means is a hydraulic motor.

4. The farm implement set forth in claim 1, wherein said tongue sections are disposed at an obtuse angle of about 130° with respect to each other.

5. The farm implement set forth in claim 1, wherein the pivotal connection between said tongue and said frame is disposed forwardly of said frame in the field direction of travel.

6. The farm implement set forth in claim 1, and further comprising means securing said tongue intermediate the length thereof to said frame when said tongue is in the transport position thereof.

7. The farm implement set forth in claim 1, wherein said tongue is in communication with said frame by a link having one end for connection to said frame at a point disposed between the longitudinal midpoint of said frame and said one end of said frame and having the other end for connection to said tongue adjacent to the juncture of said draft and connecting sections when said tongue is in the field position thereof, said latch mechanism providing the connection for one of the ends of said link to the cooperating structure.

8. The farm implement set forth in claim 7, wherein said link is pivotally connected to said frame and said latch mechanism is disposed between the free end of said link and said tongue.

9. The farm implement set forth in claim 7, and further comprising means for securing said link to said frame when said tongue is in the transport position thereof.

* * * * *